United States Patent [19]
Nakagawa et al.

[11] Patent Number: 4,882,388
[45] Date of Patent: Nov. 21, 1989

[54] RUBBER COMPOSITION

[75] Inventors: Takashi Nakagawa; Sigelu Yagisita, both of Yokohama; Masahiro Fukuyama, Chiba, all of Japan

[73] Assignee: Sumitomo Chemical Company, Limited, Osaka, Japan

[21] Appl. No.: 253,465

[22] Filed: Oct. 5, 1988

[30] Foreign Application Priority Data

Oct. 5, 1987 [JP] Japan ................. 62-249753

[51] Int. Cl.$^4$ .............. C08L 37/00; C08L 33/06; C08L 33/14; C08L 23/08
[52] U.S. Cl. .................... 525/208; 525/211; 525/213; 525/221; 525/223; 525/227; 525/913
[58] Field of Search ........... 525/208, 227, 221, 913, 525/223, 211, 213

[56] References Cited

U.S. PATENT DOCUMENTS 4,555,546 11/1985 Patel .................... 525/227
4,696,967 9/1987 Shedd et al. .......... 525/208
4,820,774 4/1989 Takao et al. .......... 525/913

Primary Examiner—Carman J. Seccuro
Attorney, Agent, or Firm—Armstrong, Nikaido, Marmelstein, Kubovcik & Murray

[57] ABSTRACT

The present invention provides a rubber composition having a good balance among low temperature resistance, oil resistance, heat aging resistance, and mechanical strength characteristics. This rubber composition comprises a rubber component composed of an ethylenic copolymer rubber and an acrylic rubber, wherein the ethylenic copolymer rubber is a copolymer comprising (a) 50 to 85% by mole of ethylene, (b) 50 to 15% by mole of an acrylate and/or a methacrylate, and (c) 0.05 to 8% by mole, based on the total of said components (a) and (b), of a cross-linked point forming monomer; and the acrylic rubber contains at least 60% by mole of at least one monomer selected from among at least an alkyl acrylate, an alkyl methacrylate and an alkoxyalkyl acrylate.

16 Claims, No Drawings

RUBBER COMPOSITION

BACKGROUND OF THE INVENTION

The present invention relates to a rubber composition comprising a rubber component composed of an ethylenic copolymer rubber and an acrylic rubber and having a good balance among low temperature resistance, oil resistance, heat aging resistance, and strength characteristics.

In recent years, a remarkable technical advance of various industries, such as automobiles, electric appliances, and machinery, made it necessary for rubber materials for use in various related parts to have versatile characteristics. It is known in the art that various special elastomers are being developed in order to meet these requirements.

In particular, in an automobile industry, further advanced performances are required for these elastomers. For example, an elastomer having well-balanced properties in respect of low-temperature flexibility besides heat aging resistance at a high temperature (175° C.) and lubricant oil resistance are desired.

Examples of the elastomer of the kind as described above which has been used in the art include an ethylenic copolymer rubber comprising ethylene-methyl (meth)acrylate and an acrylic rubber.

Although the ethylenic copolymer rubber is excellent in low temperature resistance, heat aging resistance and strength characteristics, it is poor in oil resistance. Accordingly, in order to eliminate this drawback, an attempt has been made to increase the (meth)acrylate content of the ethylenic copolymer rubber comprising ethylene and a (meth)acrylate. However, an increase in the content of the (meth)acrylate brings about a lowering in the molecular weight of the ethylenic copolymer rubber, which makes it impossible to attain not only satisfactory performances as the rubber but also good oil resistance. Therefore, other expedients for improving these properties have been desired.

On the other hand, the acrylic rubber is excellent in the oil resistance and heat aging resistance, but it is poor in the low temperature resistance. In order to solve this problem, studies have been made on rubbers wherein the alkyl group of the (meth)acrylate has been converted into a butyl group or an alkoxy group. However, these rubbers bring about lowerings in both the heat aging resistance and strength characteristics, and no elastomer having a good balance among the low temperature resistance, heat aging resistance, and strength characteristics has been developed.

SUMMARY OF THE INVENTION

An object of the present invention is to provide a rubber composition capable of providing a vulcanized rubber having a good balance among low temperature resistance, oil resistance, heat aging resistance, and mechanical strength characteristics.

The above-described object can be attained by a rubber composition comprising a rubber component composed of an ethylenic copolymer rubber and an acrylic rubber, wherein said copolymer rubber is a copolymer comprising (a) 50 to 85% by mole of ethylene, (b) 50 to 15% by mole of an acrylate and/or a methacrylate, and (c) 0.05 to 8% by mole, based on the total of said components (a) and (b), of a cross-linked point forming monomer; and said acrylic rubber contains at least 60% by mole of at least one monomer selected from among at least an alkyl acrylate, an alkyl methacrylate, and an alkoxyalkyl acrylate.

DESCRIPTION OF THE PREFERRED EMBODIMENTS

The ethylenic copolymer rubber which is a rubber component of the rubber composition of the present invention will now be described. The ethylenic copolymer rubber (hereinafter abbreviated to the "copolymer rubber") in the present invention is a copolymer comprising (a) ethylene, (b) an acrylate and/or a methacrylate, and (c) a cross-linked point forming monomer.

The ethylene content of the mixture comprising the above-described monomers (a) and (b) is 50 to 85% by mole. When the ethylene content exceeds 85% by mole, the crystallinity of the copolymer rubber is increased, which causes not only the rubber elasticity to be spoiled but also the oil resistance to be lowered.

The ethylene content is preferably 58 to 80% by mole. The acrylate and the methacrylate are respectively esters of acrylic acid and methacrylic acid with an alcohol having 1 to 8 carbon atoms, and specific examples thereof include methyl acrylate, methyl methacrylate, n-butyl acrylate, n-butyl methacrylate, tert-butyl acrylate, tert-butyl methacrylate, 2-ethylhexyl acrylate, and 2-ethylhexyl methacrylate. The acrylate and the methacrylate may be used each by itself or as a mixture of the acrylate with the methacrylate. Each of the acrylate and the methacrylate may be used alone or in the form of a mixture of the esters having different alkyl groups.

The content of the acrylate and/or methacrylate is 50 to 15% by mole based on the whole monomer mixture. When the content exceeds 50% by mole, the embrittlement point is raised, which makes it difficult to use the copolymer rubber at a low temperature. On the other hand, when the content is less than 15% by mole, the crystallinity of the copolymer rubber is increased, so that the rubber elasticity is lowered. The content of the acrylate and/or methacrylate is preferably 42 to 20% by mole.

The cross-linked point forming monomer (c) is a component indispensable for crosslinking the copolymer rubber with a vulcanizing agent. An epoxy group-containing monomer, a carboxyl group-containing monomer, etc. are usually employed as the cross-linked point forming monomer (c).

Examples of the epoxy group-containing monomer include those described in Japanese Patent Publication No. 45085/1971, e.g., unsaturated carboxylic acid glycidyl esters, such as glycidyl acrylate, glycidyl methacrylate, diglycidyl itaconate, triglycidyl butenetricarboxylate and glycidyl p-styrenecarboxylate, and unsaturated glycidyl ethers, such as vinyl glycidyl ether, allyl glycidyl ether and methallyl glycidyl ether.

Examples of the carboxyl group-containing monomer include unsaturated carboxylic acids such as acrylic acid, methacrylic acid, itaconic acid, maleic acid, fumaric acid, 2-norbornene-5-carboxylic acid, cinnamic acid, maleic anhydride, and monomethyl maleate. These cross-linked point forming monomers may be used alone or in the form of a mixture of two or more of them.

The cross-linked point forming monomer (c) is used in an amount of 0.05 to 8% by mole based on the total amount of the components (a) and (b). When the amount of the component (c) exceeds 8% by mole, the scorch resistance is lowered, while when the amount is less than 0.05% by mole, no sufficient crosslinking effect can be attained. The amount of the component (c) is preferably 0.1 to 5% by mole.

In the above-described copolymer rubber, it is possible to copolymerize the monomers (a), (b), and (c) with a monomer (d) copolymerizable therewith. Examples of the monomer (d) include isobutylene, styrene and derivatives thereof, vinyl acetate, and halogenated olefins such as tetrafluoroethylene and hexafluoropropylene.

The copolymer rubber used in the present invention can be prepared by known processes, e.g., by bulk polymerization, emulsion polymerization or solution polymerization by making use of a free radical initiator.

Representative examples of the polymerization include a process described in Japanese Patent Publication No. 45085/1971. Specifically, the copolymer rubber can be prepared in the presence of a polymerization initiator capable of producing a free radical under conditions of a pressure of 500 kg/cm2 or more and a temperature of 40° to 300° C.

The copolymer rubber in the present invention can be prepared by copolymerization of the abovedescribed monomer components, and the melt flow rate thereof at 190° C. prescribed in JIS K 7210 (=ASTM D1238) is 0.5 to 500 g/10 min, preferably 0.5 to 50 g/10 min.

The acrylic rubber of the present invention contains, as a major constituent component, at least 60% by mole of at least one monomer (e) selected from among at least an alkyl acrylate, an alkyl methacrylate, and an alkoxyalkyl acrylate.

Examples of the alkyl acrylate include methyl acrylate, ethyl acrylate, propyl acrylate, isopropyl acrylate, butyl acrylate, 2-ethylhexyl acrylate, n-octyl acrylate, isobutyl acrylate, n-pentyl acrylate, isoamyl acrylate, n-hexyl acrylate, 2-methylpentyl acrylate, n-decyl acrylate, n-dodecyl acrylate, n-tetradecyl acrylate, n-octadecyl acrylate, and n-eicosyl acrylate.

Examples of the alkyl methacrylate include methyl methacrylate, ethyl methacrylate, n-hexyl methacrylate, n-octyl methacrylate, n-dodecyl methacrylate, and n-octadecyl methacrylate.

Examples of the alkoxyalkyl acrylate include those having an alkoxy group and an alkylene group, such as methoxymethyl acrylate, methoxyethyl acrylate, ethoxyethyl acrylate, ethoxypropyl acrylate, butoxyethyl acrylate, and methoxyethoxyethyl acrylate. These monomers (e) are used alone or in a combination of two or more of them.

In order to offer a good balance among the mechanical strength characteristics, the low temperature characteristics and the oil resistance characteristics of the acrylic rubber, it is particularly preferred to use acrylates such as alkyl acrylates wherein the alkyl group has 1 to 8 carbon atoms, and alkoxyalkyl acrylates wherein the alkyl group and the alkylene group each have 1 to 4 carbon atoms. Preferable examples of the acrylates include ethyl acrylate, propyl acrylate, butyl acrylate, methoxyethyl acrylate, and ethoxyethyl acrylate.

The content of these monomers (e) in the acrylic rubber is 60 to 99.9% by mole, preferably 75 to 99.5% by mole. When the content is less than 60% by mole, the heat aging resistance and low temperature resistance of the acrylic rubber are lowered.

In the acrylic rubber of the present invention, a cross-linked point forming monomer (f) may be incorporated in the above-described monomer (e). Examples of the cross-linked point forming monomer (f) include the above-described component (c) constituting the copolymer rubber, i.e., an epoxy group-containing monomer and a carboxyl group-containing monomer, and further a halogen-containing monomer and a nonconjugated double bond-containing monomer.

Examples of the halogen-containing monomer include 2-chloroethyl vinyl ether, vinyl chloroacetate, allyl chloroacetate, vinylbenzyl chloride and 5-chloroacetoxymethyl-2-norbornene. Examples of the nonconjugated double bond-containing monomer include cyclopentadiene, methylcyclopentadiene, ethylidenenorbornene, and vinylidenenorbornene. These monomers may be used alone or in a combination of two or more of them. The content of the cross-linked point forming monomer (f) in the acrylic rubber is usually 0.1 to 10% by mole. When the content is less than 0.1% by mole, the vulcanization of the acrylic rubber is insufficient, while when the content exceeds 10% by mole, the scorching if liable to occur unfavorably.

The content of the cross-linked point forming monomer (f) is preferably 0.5 to 5% by mole.

Further, if necessary, the acrylic rubber in the present invention may also contain other monomers (g) copolymerizable with the above-described monomer (e) for the purpose of improving the oil resistance and mechanical strength characteristics.

The content of the monomer (g) is usually 30% by mole or less. Examples of the monomer (g) include vinyl aromatic compounds such as styrene, α-methylstyrene, and vinyltoluene; vinyl nitriles and vinylidene nitriles such as acrylonitrile and methacrylonitrile; vinyl monomers having a hydroxyl group such as 2-hydroxyethyl acrylate and 4-hydroxybutyl acrylate; cyano-substituted vinyl monomers such as 2-cyanoethyl acrylate, 3-cyanopropyl acrylate, and 4-cyanobutyl acrylate; vinyl amides and vinylidene amides such as acrylamide, methacrylamide, and N-methylolacrylamide; and conjugated dienes such as butadiene and isoprene. These monomers may be used alone or in a combination of two or more of them.

The acrylic rubber of the present invention can be prepared by copolymerization of the above-described monomers through ordinary emulsion polymerization. However, the acrylic rubber may be one prepared by any other process.

Since the proportions of the copolymer rubber and the acrylic rubber in the rubber composition of the present invention depend on the applications of the rubber composition, there is no limitation with respect to the proportions. However, in general, the copolymer rubber content and the acrylic rubber content are 95 to 5 parts by weight, preferably 90 to 10 parts by weight and 5 to 95 parts by weight, preferably 10 to 90 parts by weight, respectively, based on 100 parts by weight of a mixed rubber comprising both rubbers. When the amount of the copolymer rubber is less than 5 parts by weight based on 100 parts by weight of the mixed rubber, the rubber composition is excellent in the oil resistance but insufficient in the balance between the low temperature resistance and the mechanical strength characteristics. On the other hand, when the amount of the copolymer rubber exceeds 95 parts by weight, it becomes difficult to improve the oil resistance although the low temperature resistance and the mechanical strength characteristics of the rubber composition are excellent.

The rubber composition of the present invention can be prepared by mixing the above-described rubber components with a vulcanizing agent and compounding ingredients which are usually employed in the rubber industry, such as a reinforcing agent, a filler, a plasticizer, an antioxidant, a stabilizer, and a processing aid, by making use of an ordinary kneader such as a roll mixer or a Banbury mixer.

There is no particular limitation with respect to the types of various compounding ingredients and the proportions thereof, and they are selected depending upon the applications of the rubber composition. The vulcanizing agent may be one commonly used in the art for an acrylic rubber copolymerized with the above-described cross-linked point forming monomer. Examples of the vulcanizing agent include ammonium salts of organic carboxylic acids, such as ammonium benzoate (AB) and ammonium adipate, metallic soaps and sulfur when the cross-linked point forming monomer is a halogen-containing monomer; AB, dithiocarbamates, polyamines and derivatives thereof, imidazoles, polycarboxylic acids, quaternary ammonium salts, and quaternary phosphonium salts when the cross-linked point forming monomer is an epoxy group-containing monomer; polyepoxy compounds, polyamine compounds, quaternary ammonium salts, and quaternary phosphonium salts when the cross-linked point forming monomer is a carboxyl group-containing monomer; and sulfur vulcanizing agents commonly used for diene polymers when the cross-linked point forming monomer is a nonconjugated double bond-containing monomer.

In general, the rubber composition of the present invention is vulcanized after molding to prepare an intended rubber product.

As described above, according to the present invention, the use of a rubber composition comprising a rubber component composed of a copolymer rubber and an acrylic rubber enables the preparation of a vulcanized rubber not only having a good balance among low temperature resistance, oil resistance and mechanical strength characteristics but also having excellent performance in respect of the heat aging resistance or the like. By virtue of these advantages, the vulcanized rubber can widely be used for applications such as various sealing materials (gasket, O-ring, packing, and oil seal), various hoses, belts, rolls, etc.

The present invention will now be described in more detail with reference to the following Examples. In the Examples, "%" and "parts" are each based on weight.

EXAMPLE 1

An acrylic rubber, an ethylenic copolymer rubber and compounding ingredients shown in Table 1 were kneaded with each other with a 6-in. roll at 50° to 60° C. for 15 to 20 min to prepare a compound. The compound was press-vulcanized at 170° C. for 20 min and then post-vulcanized for 4 hr in a Geer oven of 150° C. With respect to the resultant vulcanized rubbers, various characteristics were measured according to JIS K 6301. The results are shown in Table 1.

It is apparent from the results that the compositions of the present invention exhibit a remarkable improvement in the balance among the low temperature resistance, the oil resistance, and the mechanical strength characteristics over each comparative example.

TABLE 1

| recipe and physical properties | Ex. of the present invention | | | | Comp. Ex. | | |
|---|---|---|---|---|---|---|---|
| | Expt. No. | | | | | | |
| | 1 | 2 | 3 | 4 | 1 | 2 | 3 |
| AR-32 (*1) | 90 | 75 | 50 | 25 | 100 | — | — |
| ethylenic copolymer (*2) | 10 | 25 | 50 | 75 | — | 100 | — |
| Vamac G (*3) | — | — | — | — | — | — | 100 |
| stearic acid | 1 | 1 | 1 | 1 | 1 | 1 | 1 |
| MAF black | 58 | 56 | 53 | 50 | 60 | 45 | 45 |
| Naugard 445 (*4) | 1 | 1 | 1 | 1 | 1 | 1 | 1 |
| ammonium benzoate | 1.3 | 1.3 | 1.3 | 1.3 | 1.3 | 1.3 | — |
| methylenedianiline | — | — | — | — | — | — | 1.25 |
| diphenylguanidine | — | — | — | — | — | — | 4.0 |
| properties of vulcanized rubber | | | | | | | |
| tensile strength (kg/cm$^2$) | 129 | 141 | 149 | 158 | 118 | 172 | 178 |
| elongation (%) | 280 | 310 | 370 | 440 | 260 | 510 | 400 |
| hardness (JIS.A) | 70 | 72 | 72 | 71 | 70 | 69 | 74 |
| oil resistance (JIS No. 3 standard oil; 150° C. × 70 hr) | | | | | | | |
| volume change (%) | +21 | +28 | +47 | +62 | +21 | +86 | +74 |
| low temperature characteristics | | | | | | | |
| embrittlement characteristics (°C.) | −23 | −27 | −30 | −33 | −21 | −34 | −32 |

Note:
*1: acrylic rubber manufactured by Nippon Zeon Co., Ltd.
*2: ethylenic copolymer rubber composition ratio (mol %): ethylene/methyl acrylate/glycidyl methacrylate = 65.2/34.0/0.8
*3: ethylene acrylate rubber manufactured by E. I. du Pont de Nemours & Co.
*4: antioxidant manufactured by Uniroyal Chem.

EXAMPLE 2

In the same manner as that of Example 1, a compound was prepared according to the recipe shown in Table 2 and subjected to vulcanization molding and then measurements of various characteristics of the vulcanized rubber. The results are shown in Table 2.

It is apparent from these results that the composition of the present invention exhibits a remarkable improvement in the balance among the oil resistance, the low temperature resistance, and the mechanical strength characteristics over the acrylic rubber and the ethylenic copolymer described in Comparative Examples 3 and 4.

TABLE 2

| | Ex. of the present invention Expt. No. | | | | | | Comp. Ex. | |
|---|---|---|---|---|---|---|---|---|
| | 1 | 2 | 3 | 4 | 5 | 6 | 3 | 4 |
| recipe and physical properties | | | | | | | | |
| AR-32 *1 | 75 | — | 55 | 60 | — | 25 | 100 | — |
| AR-101 *2 | — | 55 | — | — | 70 | — | — | — |
| ethylenic copolymer A *3 | 25 | — | 45 | — | — | 75 | — | 100 |
| ethylenic copolymer B | — | 45 | — | — | — | — | — | — |
| ethylenic copolymer C | — | — | — | — | 30 | — | — | — |
| Vamac G *4 | — | — | — | 40 | — | — | — | — |
| stearic acid | 1 | 1 | 1 | 1 | 1 | 1 | 1 | 1 |
| FEF black | 40 | 40 | 40 | 40 | 40 | 40 | 40 | 40 |

TABLE 2-continued

|  | Ex. of the present invention Expt. No. | | | | | | Comp. Ex. | |
| --- | --- | --- | --- | --- | --- | --- | --- | --- |
|  | 1 | 2 | 3 | 4 | 5 | 6 | 3 | 4 |
| Naugard 445 *5 | 1 | 1 | 1 | 1 | 1 | 1 | 1 | 1 |
| hexamethylenediaminecarbamate |  | 1 |  | 1.2 |  |  |  |  |
| pyrocatechol |  |  | 4 |  |  |  |  |  |
| cetyltrimethylammonium bromide | 2 |  | 2 |  |  | 2 | 2 | 2 |
| eicosanedioic acid | 2 |  | 2 |  |  | 2 | 2 | 2 |
| dicumyl peroxide |  |  |  |  | 2.5 |  |  |  |
| ethylene dimethacrylate |  |  |  |  | 2 |  |  |  |
| properties of vulcanized rubber |  |  |  |  |  |  |  |  |
| tensile strength (kg/cm²) | 130 | 145 | 148 | 140 | 128 | 164 | 107 | 185 |
| elongation (%) | 410 | 430 | 430 | 410 | 400 | 500 | 450 | 540 |
| hardness (JIS.A) | 57 | 60 | 59 | 59 | 61 | 59 | 59 | 60 |
| oil resistance (JIS No. 3 standard oil; 150° C. × 70 hr) |  |  |  |  |  |  |  |  |
| volume change (%) | 38 | 50 | 52 | 50 | 42 | 64 | 20 | 80 |
| low temperature characteristics (cold torsion test: ASTM D-1053) |  |  |  |  |  |  |  |  |
| $T_2$ (°C.) | −12 | −13 | −12 | −12 | −11 | −15 | 2 | −12 |
| $T_{100}$ (°C.) | −27 | −33 | −34 | −32 | −30 | −34 | −17 | −32 |

|  | rubber No. | | |
| --- | --- | --- | --- |
|  | A | B | C |
| monomer |  | (mol %) |  |
| ethylene | 65.2 | 71.5 | 74 |
| methyl acrylate | 34 |  | 26 |
| methyl methacrylate |  | 28 |  |
| glycidyl acrylate |  | 0.5 |  |
| glycidyl methacrylate | 0.8 |  |  |
| melt flow rate | 5 | 4 | 7 |

Note:
*1: acrylic rubber manufactured by Nippon Zeon Co. Ltd.
*2: acrylic rubber manufactured by Japan Synthetic Rubber Co., Ltd.
*3: ethylenic copolymer rubber
*4: ethylene-acrylate rubber manufactured by E. I. du Pont de Nemours & Co.
*5: antioxidant manufactured by Uniroyal Chem.

What is claimed is:

1. A rubber composition comprising a rubber component composed of an ethylenic copolymer rubber and an acrylic rubber, wherein said ethylenic copolymer rubber is a copolymer comprising (a) 50 to 85% by mole of ethylene, (b) 50 to 15% by mole of an acrylate and/or a methacrylate, and (c) 0.05 to 8% by mole, based on the total of said components (a) and (b), of a cross-linked point forming monomer; and said acrylic rubber contains at least 60% by mole of at least one monomer selected from among at least an alkyl acrylate, an alkyl methacrylate, and an alkoxyalkyl acrylate.

2. A rubber composition according to claim 1, wherein said acrylate and said methacrylate are each an alkyl ester having 1 to 8 carbon atoms.

3. A rubber composition according to claim 1, wherein said cross-linked point forming monomer is an epoxy group-containing monomer selected from the group consisting of an unsaturated carboxylic acid glycidyl ester and an unsaturated glycidyl ether.

4. A rubber composition according to claim 1, wherein said cross-linked point forming monomer is an unsaturated carboxylic acid.

5. A rubber composition according to claim 1, wherein the content of said ethylene is 58 to 80% by mole.

6. A rubber composition according to claim 1, wherein the content of said acrylate and/or methacrylate is 42 to 20% by mole.

7. A rubber composition according to claim 1, wherein the content of said cross-linked point forming monomer is 0.1 to 5% by mole based on the total of said components (a) and (b).

8. A rubber composition according to claim 1, wherein the melt flow rate of said ethylenic copolymer rubber is 0.5 to 500 g/min.

9. A rubber composition according to claim 1, wherein an alkyl group of said alkyl acrylate contained in said acrylic rubber has 1 to 8 carbon atoms.

10. A rubber composition according to claim 1, wherein an alkyl group and an alkylene group of said alkoxyalkyl acrylate contained in said acrylic rubber each have 1 to 4 carbon atoms.

11. A rubber composition according to claim 1, wherein the content of said monomer contained in said acrylic rubber is 60 to 99.9% by mole.

12. A rubber composition according to claim 1, wherein the content of said monomer contained in said acrylic rubber is 75 to 99.5% by mole.

13. A rubber composition according to claim 1, wherein said acrylic rubber further contains a cross-linked point forming monomer.

14. A rubber composition according to claim 13, wherein said cross-linked point forming monomer is at least one monomer selected from the group consisting of an epoxy group-containing monomer, a carboxyl group-containing monomer, a halogen-containing monomer, and a nonconjugated double bond-containing monomer.

15. A rubber composition according to claim 13, wherein the content of said cross-linked point forming monomer in said acrylic rubber is 0.1 to 10% by mole.

16. A rubber composition according to claim 1, wherein the content of said ethylenic copolymer rubber and the content of said acrylic rubber are 95 to 5 parts by weight and 5 to 95 parts by weight, respectively, based on 100 parts by weight in total of said ethylenic copolymer rubber and said acrylic rubber.

* * * * *

UNITED STATES PATENT AND TRADEMARK OFFICE
CERTIFICATE OF CORRECTION

PATENT NO. : 4,882,388

DATED : November 21, 1989

INVENTOR(S) : NAKAGAWA et al

It is certified that error appears in the above-identified patent and that said Letters Patent is hereby corrected as shown below:

On the cover page, Item [73], the Assignee should read:

--Nippon Zeon Co., Ltd., Tokyo; Sumitomo Chemical Company, Limited, Osaka, both of Japan--.

Signed and Sealed this

First Day of January, 1991

Attest:

HARRY F. MANBECK, JR.

*Attesting Officer*  *Commissioner of Patents and Trademarks*